Jan. 5, 1937.  H. A. COOK ET AL  2,066,960
WIRING SYSTEM AND FITTING THEREFOR
Filed Nov. 6, 1934  3 Sheets-Sheet 1

Inventors:
Henry A. Cook,
Louis F. Kummel,
by Harry E. Dunham
Their Attorney.

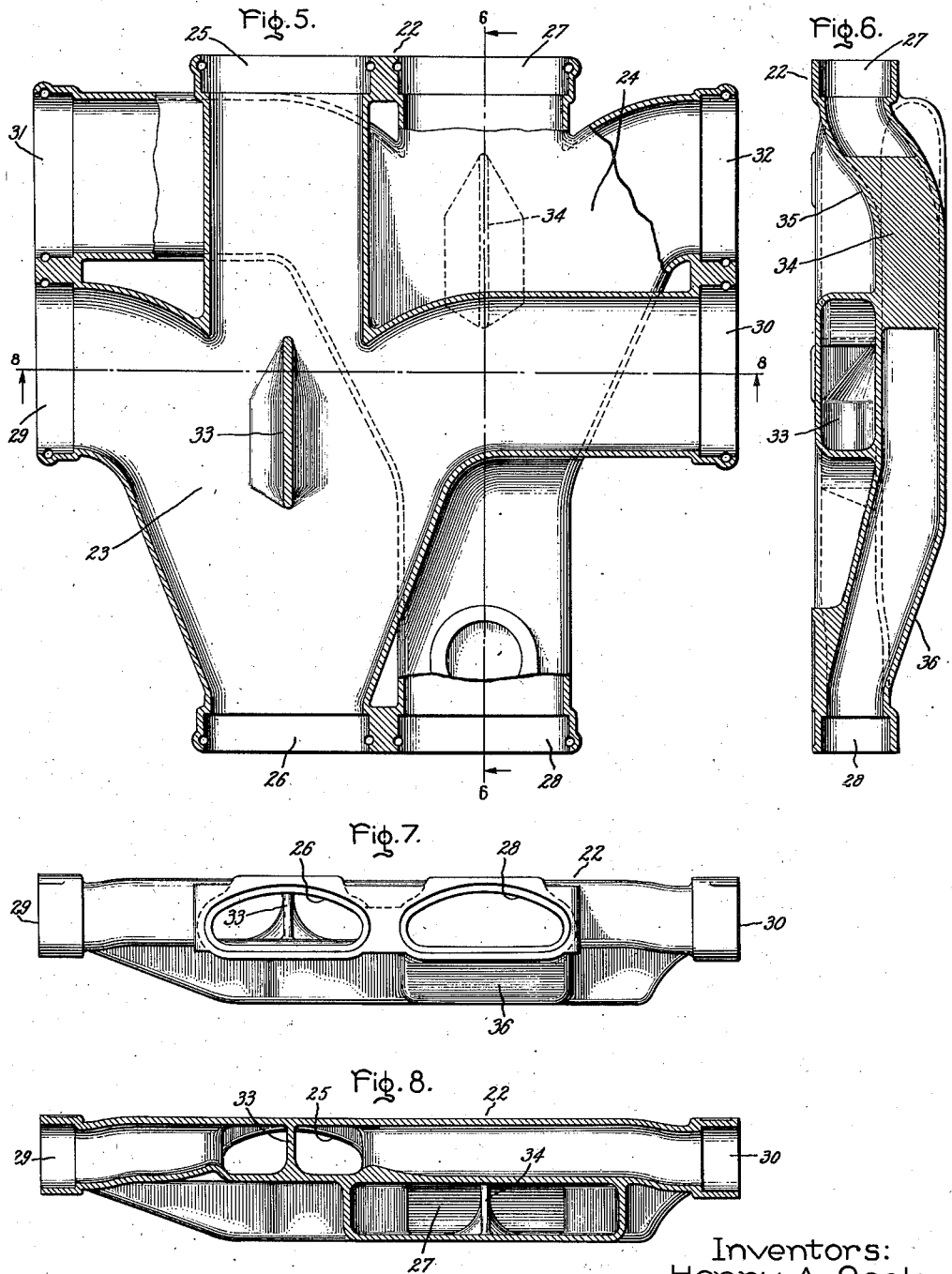

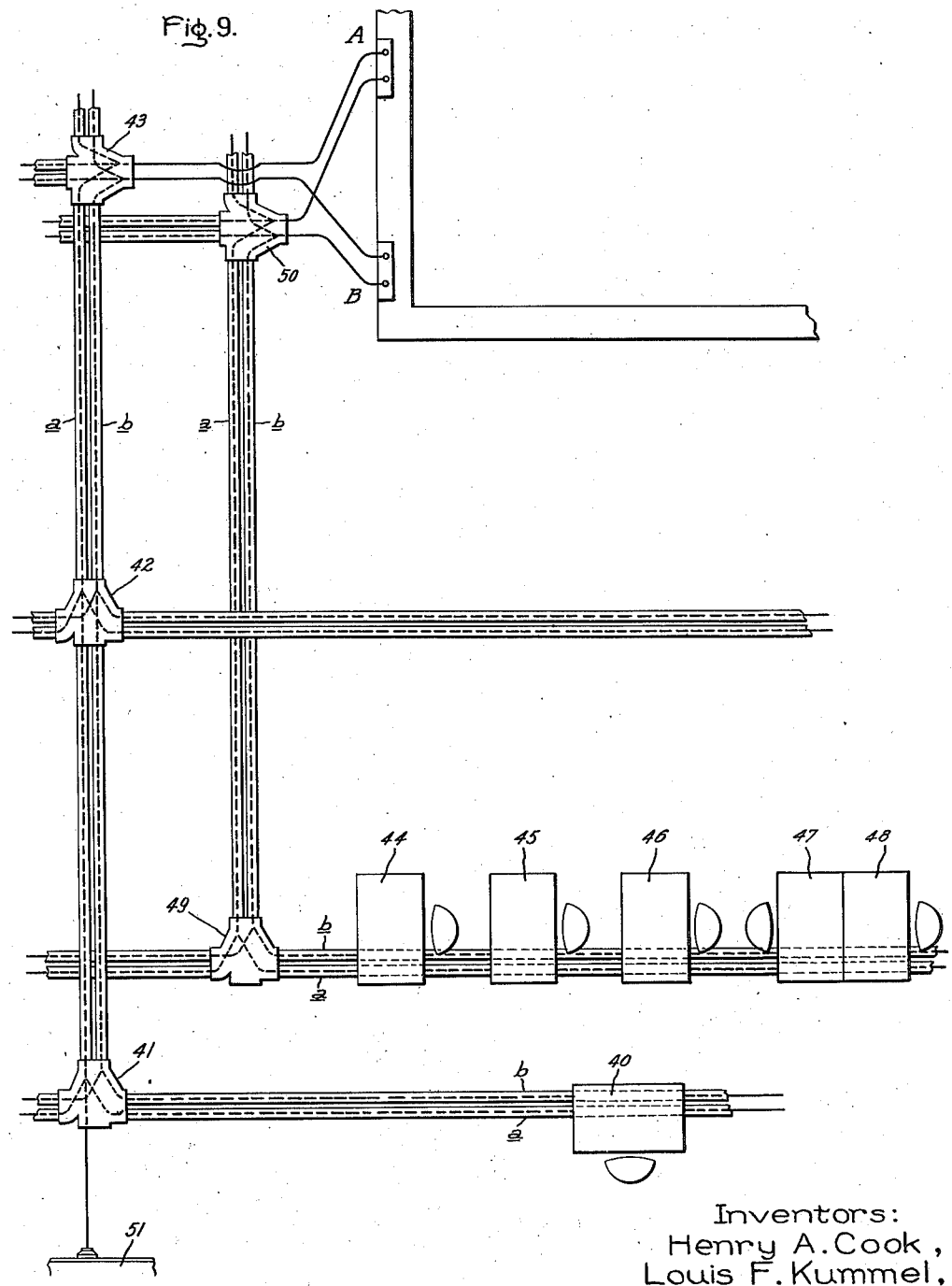

Patented Jan. 5, 1937

2,066,960

UNITED STATES PATENT OFFICE 2,066,960

WIRING SYSTEM AND FITTING THEREFOR

Henry A. Cook, Stratford, Conn., and Louis F. Kummel, Chicago, Ill., assignors to General Electric Company, a corporation of New York Application November 6, 1934, Serial No. 751,700

3 Claims. (Cl. 247—15)

Our invention relates to a wiring system and more particularly to a duct fitting for interconnecting transverse lines of duct.

In the wiring of office buildings, it has become a practice to provide a plurality of transverse ducts embedded in the floor through which the electric conductors may be passed and connected to an outlet at any point along the line of the duct subsequent to the completion of the building. The primary purpose of this system of wiring in office buildings is to permit flexibility in the wiring so that when a new tenant occupies an office he may relocate the outlets to suit his particular purposes. To provide a maximum flexibility, it has been necessary to use a number of lines of duct running at right angles to each other and spaced relatively close together. At intersections of transverse lines of duct, a junction box has been provided with a removable cover located near the surface of the floor. When it is desirable to provide an outlet at a particular point, an opening is made in the duct at that point. The nearest junction box in that line of duct is located and the cover removed. The conductors then extend from this junction box to the opening provided in the duct. If conductors connected to the electrical supply circuit do not pass through the junction box then it is necessary to thread conductors from the junction box through a duct back to a point of supply. In many cases it may be necessary to thread the conductors from one junction box to another and many junction boxes may be located between the opening made in the duct and the nearest source of supply.

The object of our invention is to reduce the labor necessary in providing an outlet in such a duct system by eliminating the necessity of junction boxes and making it possible to thread the conductors back to the source of supply directly from the opening made in the duct without making an intermediate opening in the floor.

Figure 1:
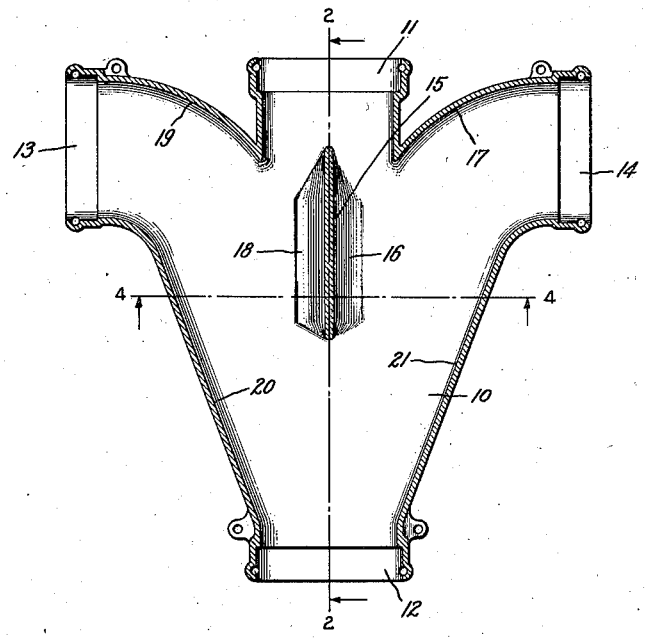
Figure 2:
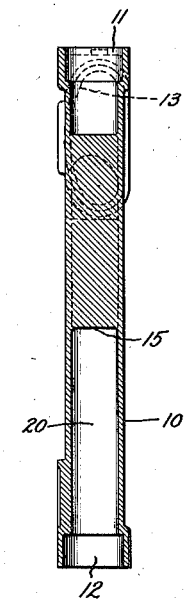
Figure 3:
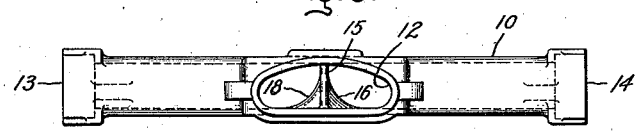
Figure 4:
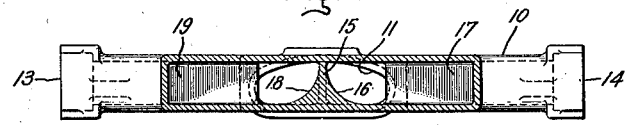

What we consider novel and our invention will be better understood by reference to the following specification and appended claims when considered in connection with the accompanying drawings in which Fig. 1 is a sectional view of a fitting for interconnecting transverse lines of duct; Fig. 2 is a side sectional view of the fitting along line 2—2 of Fig. 1; Fig. 3 is a side view of the fitting and Fig. 4 is a side sectional view along line 4—4 of Fig. 1; Fig. 5 is a sectional view of a fitting adapted to connect two parallel transverse lines of duct; Fig. 6 is a side sectional view along lines 6—6 of Fig. 5; Fig. 7 is a side view of the duct of Fig. 5; Fig. 8 is a side sectional view of the fitting along line 8—8 of Fig. 5 and Fig. 9 is a diagrammatic illustration of an underfloor duct system with the fitting of Fig. 5 shown connecting the intersecting points of the two parallel lines of duct.

Referring to the drawings, in Fig. 1 a fitting 10 is shown which is adapted to interconnect an intersecting transverse line of duct. The longitudinal line of duct is adapted to be connected to the fitting in the openings 11 and 12. The transverse line of duct is adapted to be connected to the fitting in the side openings 13 and 14. In threading conductors through a duct, it is the practice to first thread through a fish or steel wire which is considerably more rigid than the electrical conductors and connect the electrical conductors to the end of the fish and pull the conductors through the duct. The fitting 10 is so arranged that all of the conductors must pass out of opening 12 toward the source of supply to which they must be connected. A fish then being passed through the transverse line of duct into opening 14 must leave the fitting through opening 12. In the ordinary type of fitting, such as a junction box, used at this point in place of fitting 10, it would be necessary to remove the cover. When the fish entered through the opening 14 it would be necessary to bend the fish and pass it out through the opening 12. To make it unnecessary to provide a cover for the fitting 10 and to direct the fish by hand, a deflector 15 is provided located in the longitudinal center line of the fitting between the side openings and having a concave surface 16 which is in the path of any fish entering opening 14, and serves to direct the fish toward opening 12. The wall 17 of fitting 10 is so curved that when the fish passing from the transverse duct into the opening 14 enters the fitting it engages this curved wall 17 and is initially directed toward the center of the fitting and the deflector 15. The fish on further movement then engages the concave surface 16 and is further bent or deflected toward the opening 12 and is directed upward toward the top of the fitting. For directing a fish entering the transverse duct through the opening 13 from the opposite direction, a similar concave surface 18 is provided in the deflector 15 facing toward the opening 13 which in cooperation with the curved wall 19 of the fitting deflects the fish and directs it from the opening 13 toward the opening 12 and upward as it passes through the fitting. Walls 17 and 19 converge toward opening 12. When it is desired to pass conductors through the longitudinal line of duct then the conductors must be passed from the top to the bottom of the fitting as shown in Fig. 1 of the drawings, so the conductors will enter the opening 11 and pass out through the opening 12. In such a case the fish would readily pass through the fitting on one side or the other of the deflector 15 and no surface will be engaged which will tend to cause the fish to pass out through any other opening of the fitting. In case the fish should be bent by engagement with the side wall of the duct it will be deflected toward the opening 12 by engagement with either of the angular walls 20 or 21 of the fitting 10 which converge toward opening 12. As may be seen in Figs. 3 and 4 the transverse section of the deflector 15 is wider at the bottom than at the top forming the surface 16 on one side to direct a fish entering through opening 14 upward and toward opening 12 and surface 18 on the other side serving to direct a fish entering from opening 13 upward and toward opening 12. The purpose of shaping surfaces 16 and 18 of deflector 15 to direct the fish upward as well as toward the common opening 12 is to prevent the fish from becoming entangled with conductors which have been previously laid in the ducts and fitting. In addition, the openings 11, 13 and 14 are shaped the same as opening 12 which as best indicated in Fig. 3 is so shaped as to direct the fish toward the top of the duct as it enters and leaves the fitting. By this arrangement the full capacity of the ducts and fittings may be utilized without experiencing any difficulty in pulling the last conductor through the duct.

In order to provide both electrical outlets for a power supply and outlets for the telephone circuit, it is necessary to have two separate lines of ducts which are generally run in parallel lines and located adjacent each other. For such a system a double fitting as shown in Fig. 5 is provided in which two separate chambers are provided through which the different conductors for the two different circuits may pass and are separated from each other to prevent the possibility of a short circuit occurring in the conductors connected to the two different circuits. The double fitting as indicated by the numeral 22 comprises substantially two chambers 23 and 24 having openings 25, 26 and 27, 28 respectively to which the longitudinal runs of duct are adapted to be connected to the fitting 22. Similarly, side openings 29, 30 and 31, 32 are provided respectively for the two chambers 23 and 24 to which the transverse runs of duct may be connected to connect the duct to the fitting 22. In the chambers 23 and 24 deflectors 33 and 34 are provided respectively which are similar to the deflector 15 provided in the single fitting 10. By means of deflector 33 a fish which enters through opening 30 into chamber 23 is deflected upward and directed toward opening 26. Similarly a fish entering from the duct into opening 29 is deflected upward and directed toward opening 26. A fish which enters opening 25 passes directly through chamber 23 and out of opening 26. A fish which enters through the transverse line of duct into opening 32 is deflected downward by the top wall of 35 of the chamber 24, as is best indicated in Fig. 6. The fish then engages the deflector 34 and passes toward the opening 28 engaging the bottom wall 36 of chamber 24 and passing out through the opening 28. In a like manner a fish entering through opening 31 into chamber 24 passes downward into engagement with deflector 34 and then upward again through opening 28.

Also, a fish entering through opening 27 passes downward into chamber 24 and then upward out through opening 28. In Figs. 5, 6 and 8 it will be seen that due to the shape of deflector 34 and its location in chamber 24 the fish is directed toward the top of the chamber to cause the fish to pass freely over the top of any conductors which have been located previously in the chamber 24. In addition the shape of all the openings is such as to direct the fish toward the top of the duct as it enters and leaves the fitting. The walls of chambers 23 and 24 converge toward openings 26 and 28 to assist in directing the fish through the fitting and out of openings 26 and 28. As indicated in Figs. 7 and 8, all of the openings into the chambers 23 and 24 have their axes in a common plane but the major portion of chamber 24 is located beneath chamber 23.

In Fig. 9 a duct lay-out is shown with the double fitting of Fig. 5 shown connecting the lines of intersecting transverse ducts. The letters A and B are used to indicate respectively the point at which the conductors are connected to the power supply and the telephone switchboard. The duct through which the conductors pass to provide a power outlet are indicated by the letter $a$ and the ducts through which the conductors pass connected to the telephone switchboard are indicated by the letter $b$. The ducts $a$ and $b$ with the fittings are laid in the floor which may be formed of concrete, before the top surface of concrete is poured. When it is desirable to provide outlets for a desk, such as desk 40, two openings are made, one communicating with the transverse run of duct $b$ and the other with the transverse run of duct $a$ at the location of the desk 40. A fish is then run from the opening in duct $b$ through the duct to fitting 41 and passing through the fitting 41 is directed to the longitudinal run of duct $b$ through fitting 42, running straight through the fitting, to fitting 43 where it is directed by the fitting to the right out of the open end of the fitting. The conductors are then secured to the end of the fish adjacent desk 40 and the conductors are pulled through the line of duct by the fish. The conductors are then connected to the telephone switchboard B. Similarly, a fish is passed through the opening in duct $a$ adjacent to desk 40 and passes through fitting 41 to the longitudinal run of duct $a$ straight through fitting 42 to fitting 43 where it passes out of its opening. Conductors are then secured to the end of the fish adjacent desk 40 and pulled through the run $a$ of duct and connected to the power supply circuit at A. Similarly, when a series of desks may be located along an adjacent transverse run of ducts $a$ and $b$, such as desks 44, 45, 46, 47 and 48, openings are made adjacent the location of these desks in the transverse run of ducts $a$ and $b$ and a fish is first run from the opening through ducts $a$ and $b$ to fitting 49 where they are directed to the longitudinal runs of ducts $a$ and $b$ connected to the fitting up to fitting 50 where they are directed to the right out through an opening of fitting 50. The conductors are then pulled through the lines of duct out through the opening of fitting 50 and connected respectively to the power supply A and the telephone switchboard B. If it were only desired to provide a telephone outlet adjacent each desk, it would only be necessary to have a single line of duct in which case a single fitting of the type shown in Fig. 1 would be used to connect the intersecting transverse lines of duct. In addition, in any case in which the two parallel lines of duct are provided for both power outlets and telephone outlets it may be desirable to provide only a power outlet such as indicated at 51. It is only necessary to make one opening into the duct line a which in this case may most conveniently be done by making an opening adjacent the open end of fitting 41 and passing the conductors through the longitudinal run of duct a through fitting 42 to fitting 43 where the conductors pass out of the open end and may be connected to the source of power supply.

From the foregoing it will be seen that an underfloor duct system and fitting are provided which make it possible to run the conductors from the point at which the opening is made in the duct system back to a common point of connection where the source of power supply is located without the necessity of junction boxes at every point at which transverse ducts intersect. This greatly reduces the cost of installing the duct system as it makes it unnecessary to carefully locate the junction boxes so that they may be readily accessible after the floor is finished and in addition it greatly reduces the labor costs in providing outlets at the desired points subsequent to the completion of the installation.

What we claim as new and desire to secure by Letters Patent of the United States, is:

1. A duct fitting having side openings and end openings, converging side walls, and a deflector located on the center line of said end openings and between said side openings to prevent a wire from passing from one side opening to the other and cooperating with said converging side walls to direct it out of one of said end openings, said deflector being of such width as to permit a wire to pass on either side from one end opening directly through and out of the other end opening.

2. A duct fitting having side openings and end openings, and a deflector located on the center line of said end openings and between said side openings to prevent a wire from passing from one side opening to the other and to direct it out of one of said end openings, said deflector being tapered toward the top of the fitting to direct the wire upward as well as toward one end opening to permit it to pass over any wires which may have been previously located in the fitting and also permitting a wire to pass from one end opening directly through and out of the other end opening.

3. A duct fitting having a plurality of chambers, side openings on the same center line in each chamber, end openings on a common center line in each chamber, and a deflector in each chamber tapered toward the top of the chamber and located on the center line of the end openings between the side openings to prevent a wire that enters one side opening from passing through the other side opening and directing it toward one of said end openings, said deflector permitting the passage of a wire directly through the fitting from one end opening out of the other end opening.

HENRY A. COOK.
LOUIS F. KUMMEL.